R. W. SCOTT.
MACHINE FOR KNITTING WELTED AND OTHER FABRICS.
APPLICATION FILED DEC. 13, 1915.

1,282,958.

Patented Oct. 29, 1918.
5 SHEETS—SHEET 1.

Inventor:
Robert W. Scott,
by Roberts, Roberts & Cushman
his attorneys

R. W. SCOTT.
MACHINE FOR KNITTING WELTED AND OTHER FABRICS.
APPLICATION FILED DEC. 13, 1915.
1,282,958.
Patented Oct. 29, 1918.
5 SHEETS—SHEET 2.
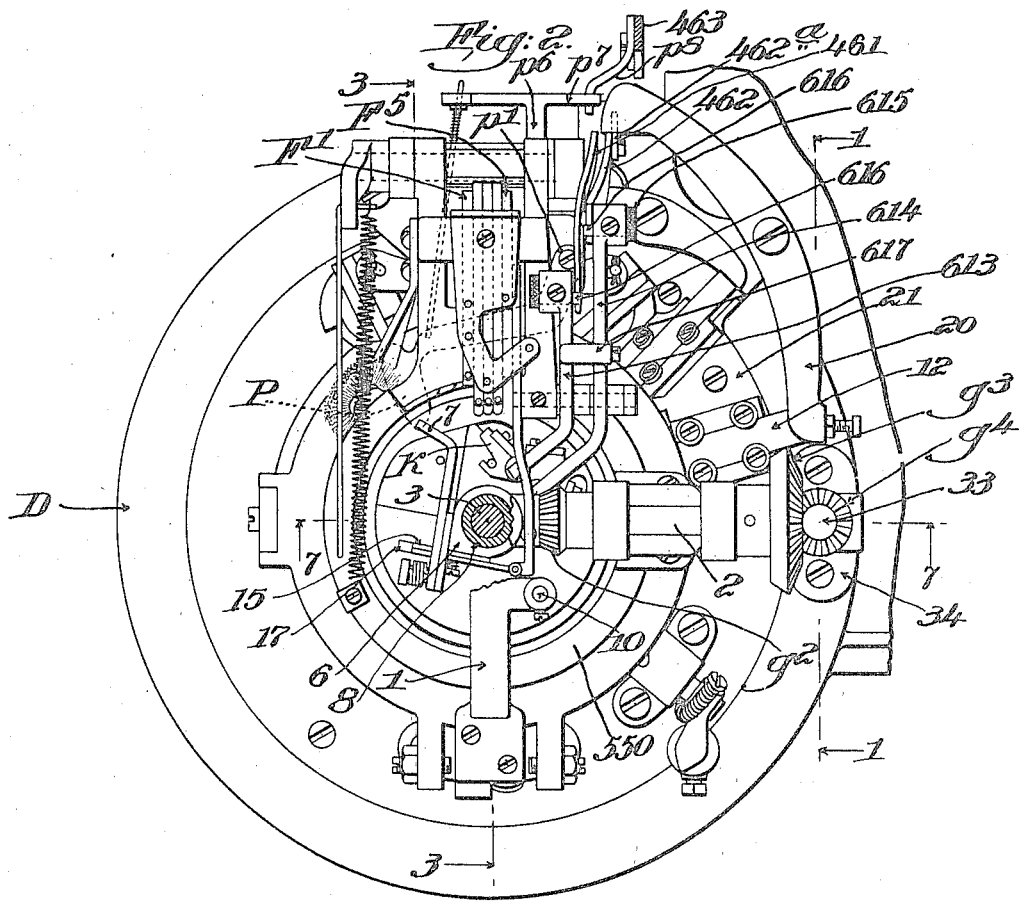
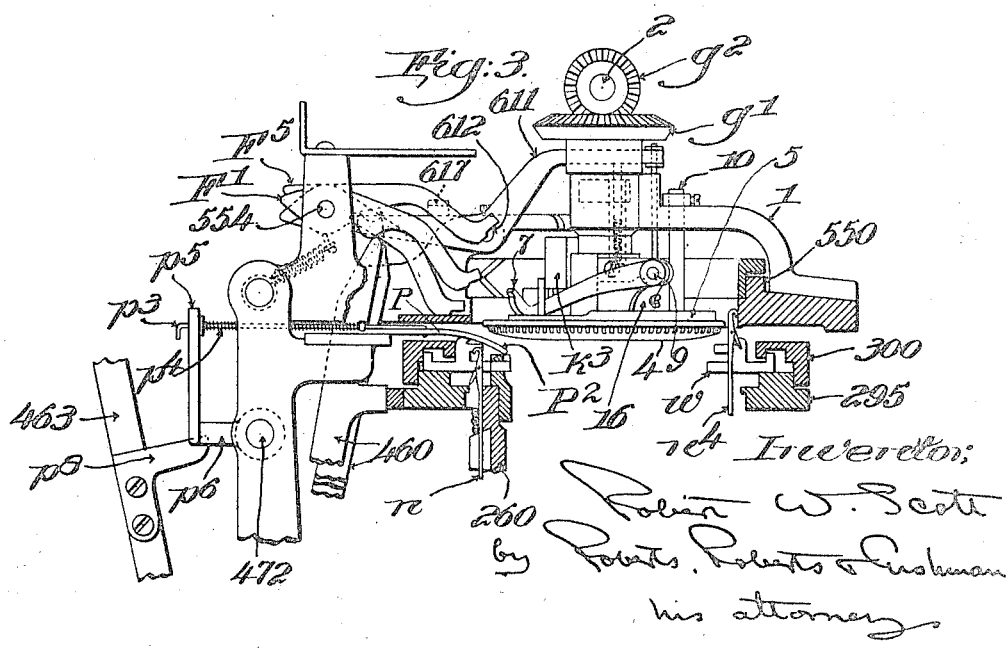

R. W. SCOTT.
MACHINE FOR KNITTING WELTED AND OTHER FABRICS.
APPLICATION FILED DEC. 13, 1915.
1,282,958.
Patented Oct. 29, 1918.
5 SHEETS—SHEET 3.
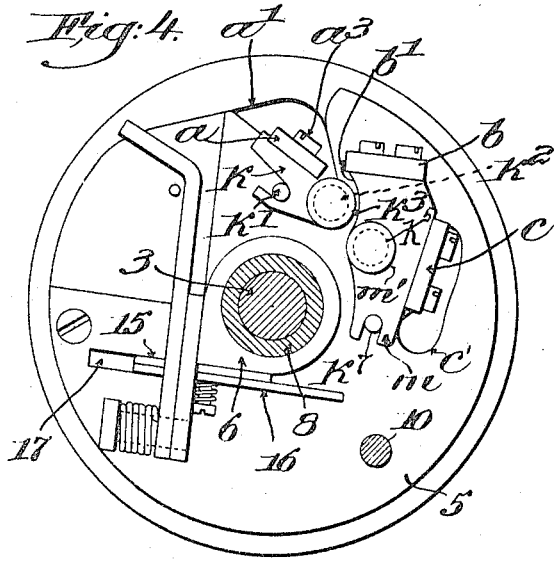
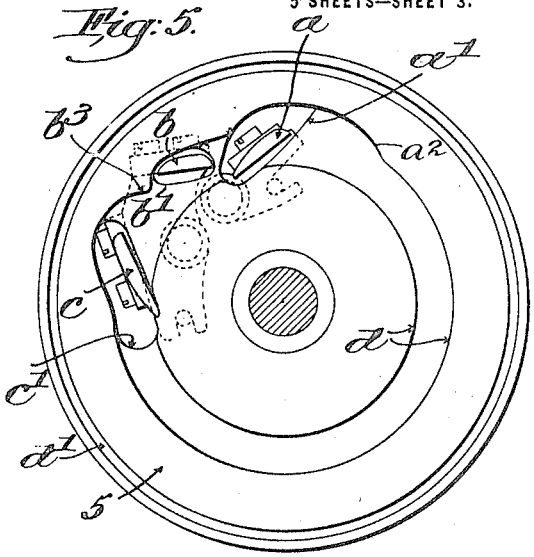
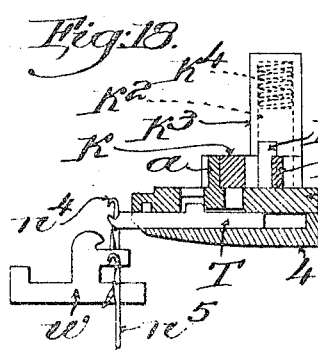
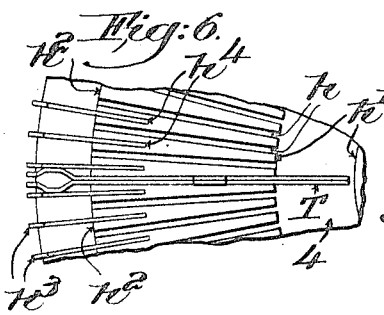
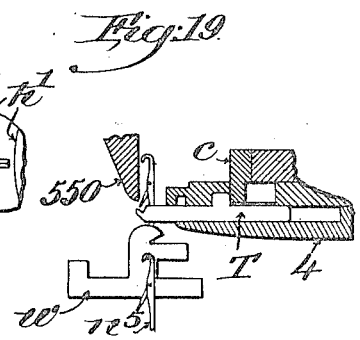
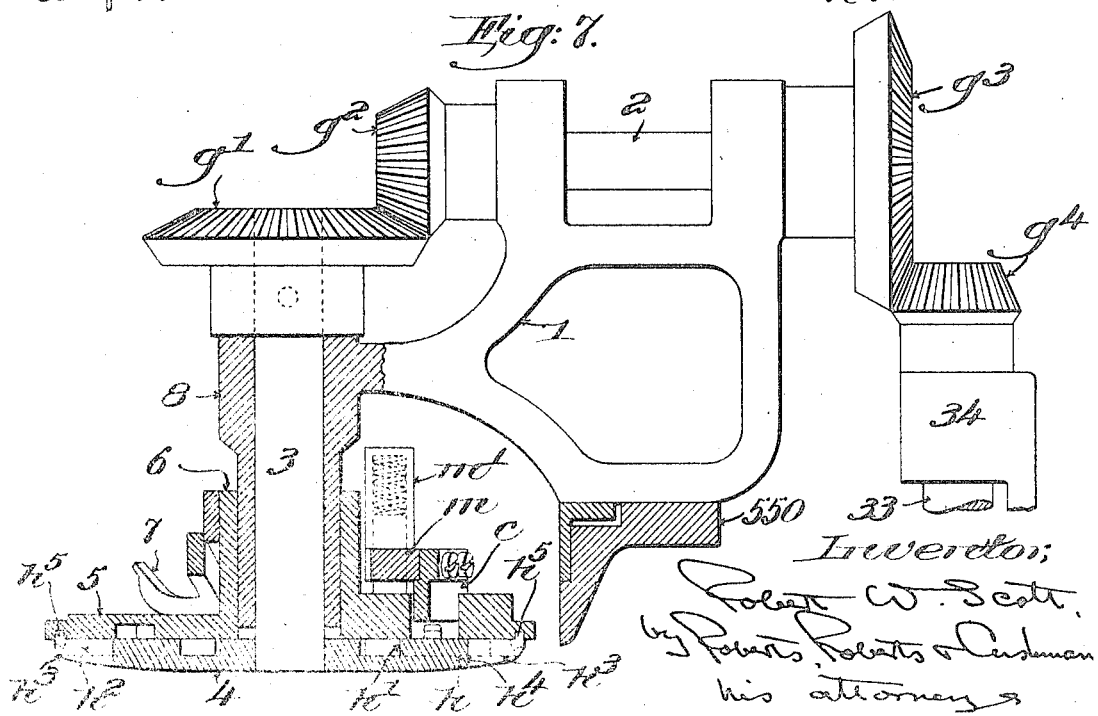

R. W. SCOTT.
MACHINE FOR KNITTING WELTED AND OTHER FABRICS.
APPLICATION FILED DEC. 13, 1915.
1,282,958.
Patented Oct. 29, 1918.
5 SHEETS—SHEET 4.
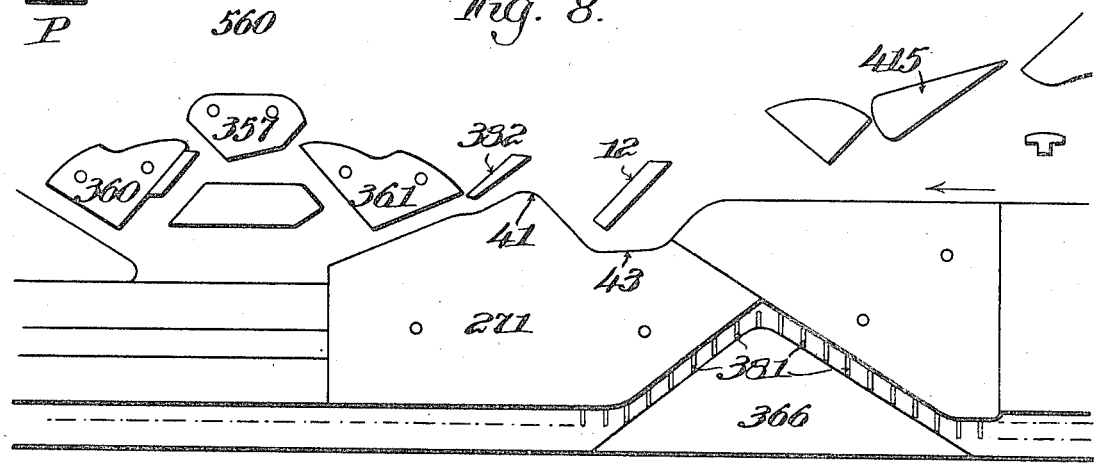
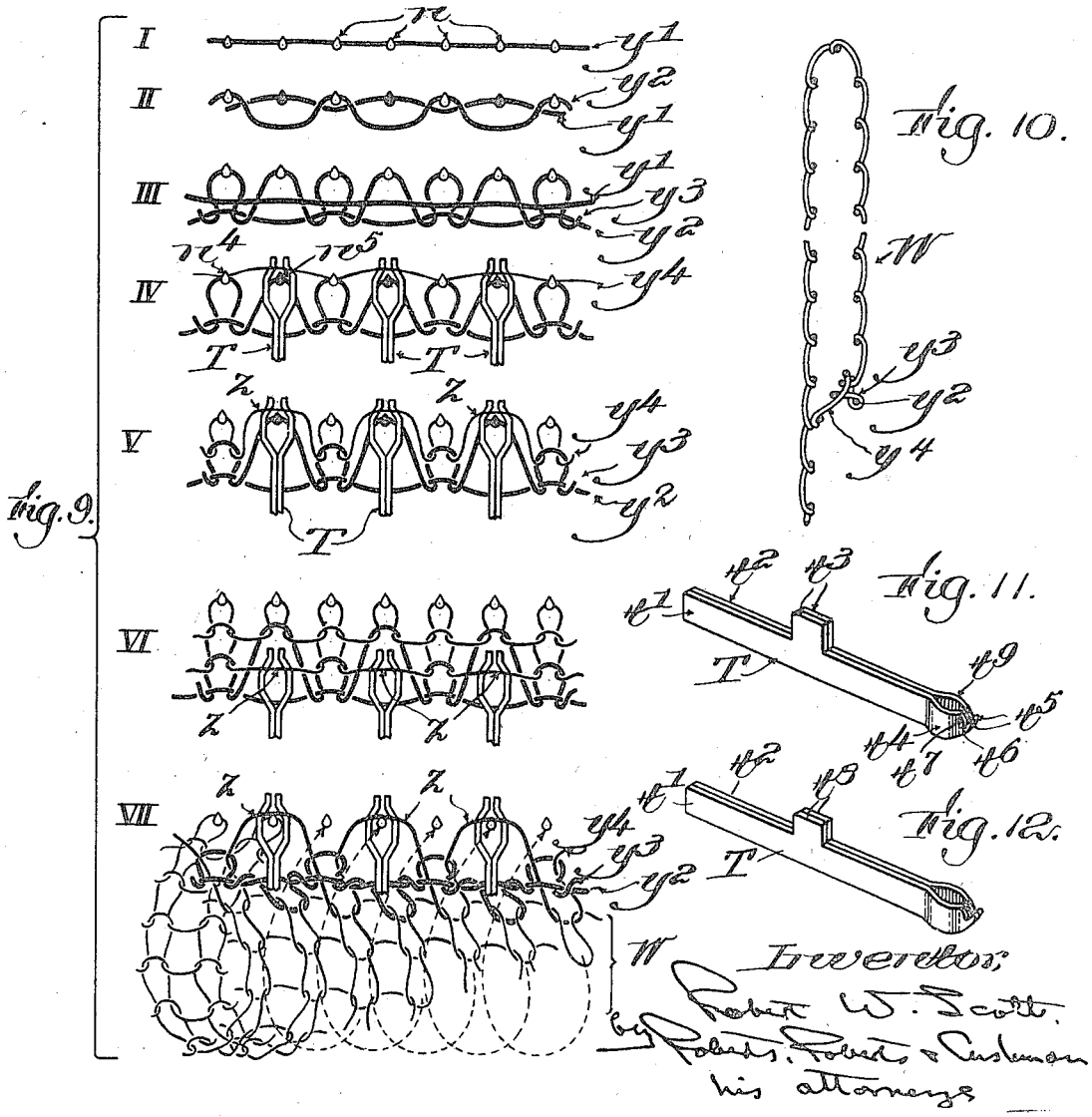

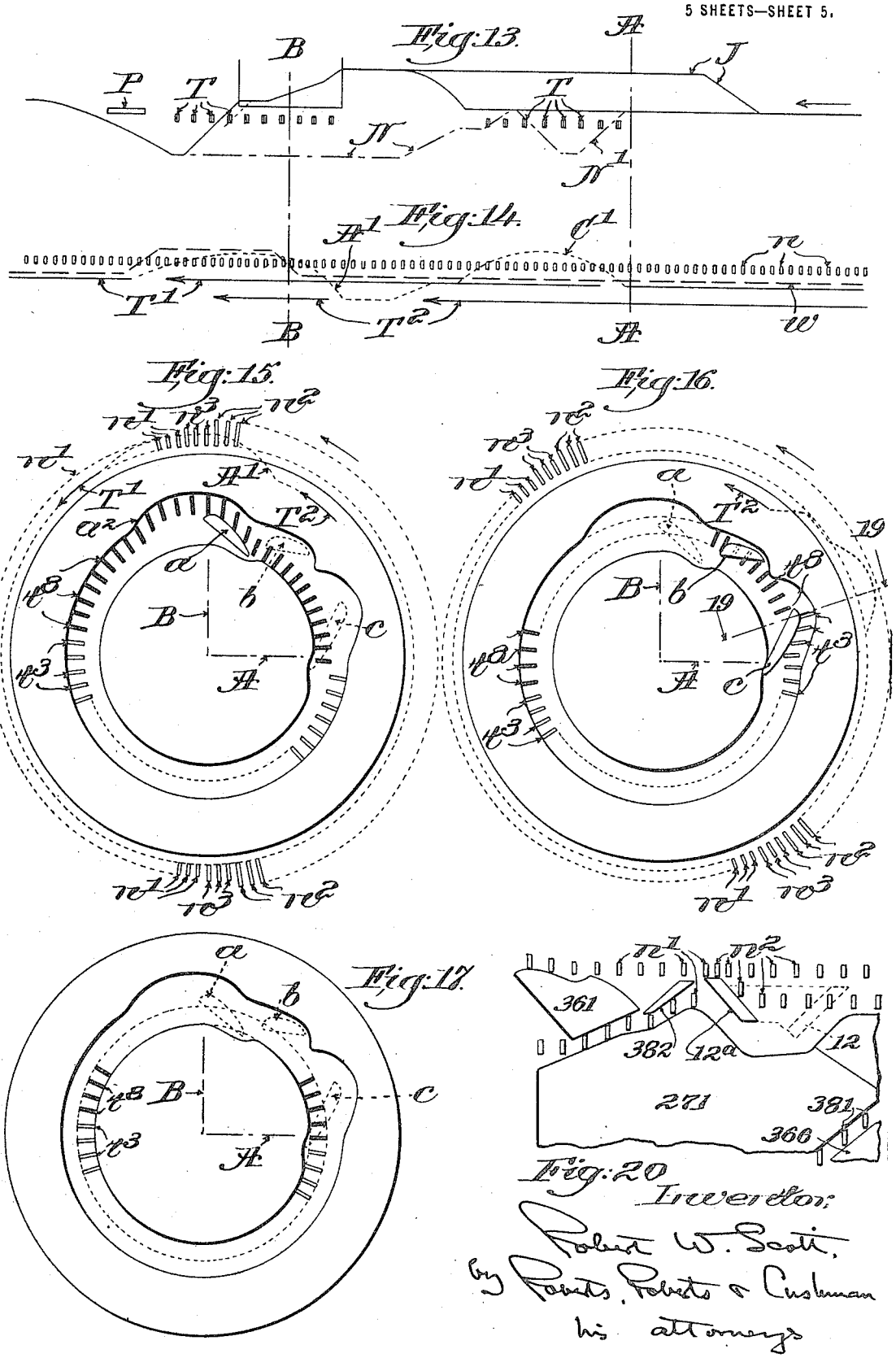

UNITED STATES PATENT OFFICE.

ROBERT W. SCOTT, OF BOSTON, MASSACHUSETTS, ASSIGNOR, BY MESNE ASSIGNMENTS, TO SCOTT & WILLIAMS, INCORPORATED, A CORPORATION OF MASSACHUSETTS.

MACHINE FOR KNITTING WELTED AND OTHER FABRICS.

1,282,958.  Specification of Letters Patent.  Patented Oct. 29, 1918.

Application filed December 13, 1915. Serial No. 66,424.

*To all whom it may concern:*

Be it known that I, ROBERT W. SCOTT, a citizen of the United States, and resident of Boston, in the county of Suffolk and State of Massachusetts, have invented new and useful Improvements in Machines for Knitting Welted and other Fabrics, of which the following is a specification.

My invention relates to machines for making knit articles, such as stockings or other knit apparel, one object of my invention being to provide a machine capable of knitting such articles so that they shall have an integral in-turned welt formed during manufacture, said welt being continuous with the fabric of the article at one end and fastened at or near the other end to the body fabric on the inner or back face of the body fabric by an improved knit structure, the welt having its face or wale side outside.

Other objects of my invention are to provide a knitting machine capable of automatically beginning to knit an article or section of fabric characterized by a selvage or beginning edge with devices capable of forming an inturned welt, and to improve the construction and operative capacities of hosiery knitting machines of the type provided with a dial for needles or other operated instruments coöperating with the needles employed for knitting a part or the whole of the article of hosiery produced.

In my Letters Patent No. 864,433, dated August 27, 1907, I explained how to knit a plain fabric stocking having an in-turned welt integrally united to the body of the stocking, which stocking and the method of making the same are claimed in my said patent. In said method the first step comprises forming a setting-up course taken alternately by knitting needles of two different series capable of being operated in directions at an angle to each other, and thereafter knitting upon one of said sets of needles fabric for the welt during retirement of the other set while still retaining the loops of the setting-up course; thereafter transferring the setting-up course or a course near it from the needles on which it had been retained to the needles employed in knitting the welt fabric, and then retiring the set of needles which so far had been employed only to take the setting-up course, and then completing the article. The fabric so produced is desirable in all respects excepting strength of the knit structure at the juncture of welt and body. The yarn of the setting-up course formed as stated constitutes the only protection of the fabric of the welt against raveling, and is in a situation at which its rupture not only rips the suture or seam fastening the beginning edge of the welt in place, but leaves the welt fabric in condition to ravel freely, since a setting-up course so made necessarily is united to the welt fabric by loops at least in alternate wales at the beginning of the welt-fabric, breakage of any one of which loops permits raveling. Practice of the said method by machine requires use of a second set of knitting needles capable of being passed beyond the first set, such a machine as built including a set of swing-jack dial needles for which the supporting and operating mechanisms takes space and necessitate complexity.

By my present invention I have avoided necessity for the use of a second set of needles, and I have avoided any weakness of the fabric, greatly simplified the construction of the machine, and enabled production of a welt in which the uniting or tying course is not a setting-up course relied upon to protect the welt-fabric from raveling, the welt-fabric having instead a strong selvage edge which prevents the welt-fabric from raveling whether or not the uniting course holding the first and last knit parts of the welt together is broken. I thus enable the product to have a strong knit structure at the juncture of welt and body, which will not permit the welt to ravel, and which may have uniting loops at any desired frequency, such as every second, fourth, or sixth needle wale of the fabric.

By my present invention I have also provided for forming in the fabric made on a single series of needles a knit structure adapted to be laid hold of, carried away from the needles, and returned to the needles by simple implements, the fabric being characterized by bights of yarn related to the accompanying knit fabric in such a manner as to enable a free-ended pointed implement without a backwardly pointing hook or barb, when passed or taking between said bights and the accompanying fabric, to lay hold of the fabric by such engagement with sufficient security to permit carrying it away from the working place of the needles.

My invention also provides means causing a series of such simple points to receive, take away, and subsequently transfer a taken bight to a needle by a series of movements of advance and retraction.

Referring now to the accompanying drawings,

Fig. 3 is a section on the line 3—3 of Fig. 2;

Fig. 4 is a detail plan of the dial cap;

Fig. 5 is an under plan of the dial cap illustrating certain cams;

Fig. 6 is an enlarged fragmentary plan above the dial, showing some of the needles and a transfer implement;

Fig. 7 is an elevation in vertical section in part on the line 7—7 of Fig. 2;

Fig. 8 is a diagram development of the cylinder cam ring;

Fig. 9 is a series of diagrams illustrating the formation of a characteristic fabric;

Fig. 10 is a section through a welt formed by the steps illustrated in Fig. 9;

Fig. 11 is a perspective of a transfer implement having a longer operating butt;

Fig. 12 is a perspective similar to Fig. 11, showing a shorter butt transfer implement;

Figs. 13 and 14 are respectively a diagram in elevation and a diagram in plan, showing the relative motions of the needles, transfer implements and web holders;

Fig. 15 is a diagram plan of the dial cap and transfer implements when taking bights of yarn to withhold them for subsequent transfer;

Fig. 16 is a similar diagram illustrating the beginning of the transfer operation;

Fig. 17 is a similar diagram illustrating the position of the parts during the knitting of fabric subsequent to the welt;

Fig. 18 is a section on line B—B of Fig. 15, showing the position of needles, transfer implement, and web holders at the time represented by Fig. 15;

Fig. 19 is a section on line 19—19 of Fig. 16 representing the position of the parts at the time represented by Fig. 16;

Fig. 20 is a development similar to Fig. 8 showing a modification;

Fig. 21 is a detail plan above the web-holder cap showing the welt presser and operating connections therefor.

Figure 1:
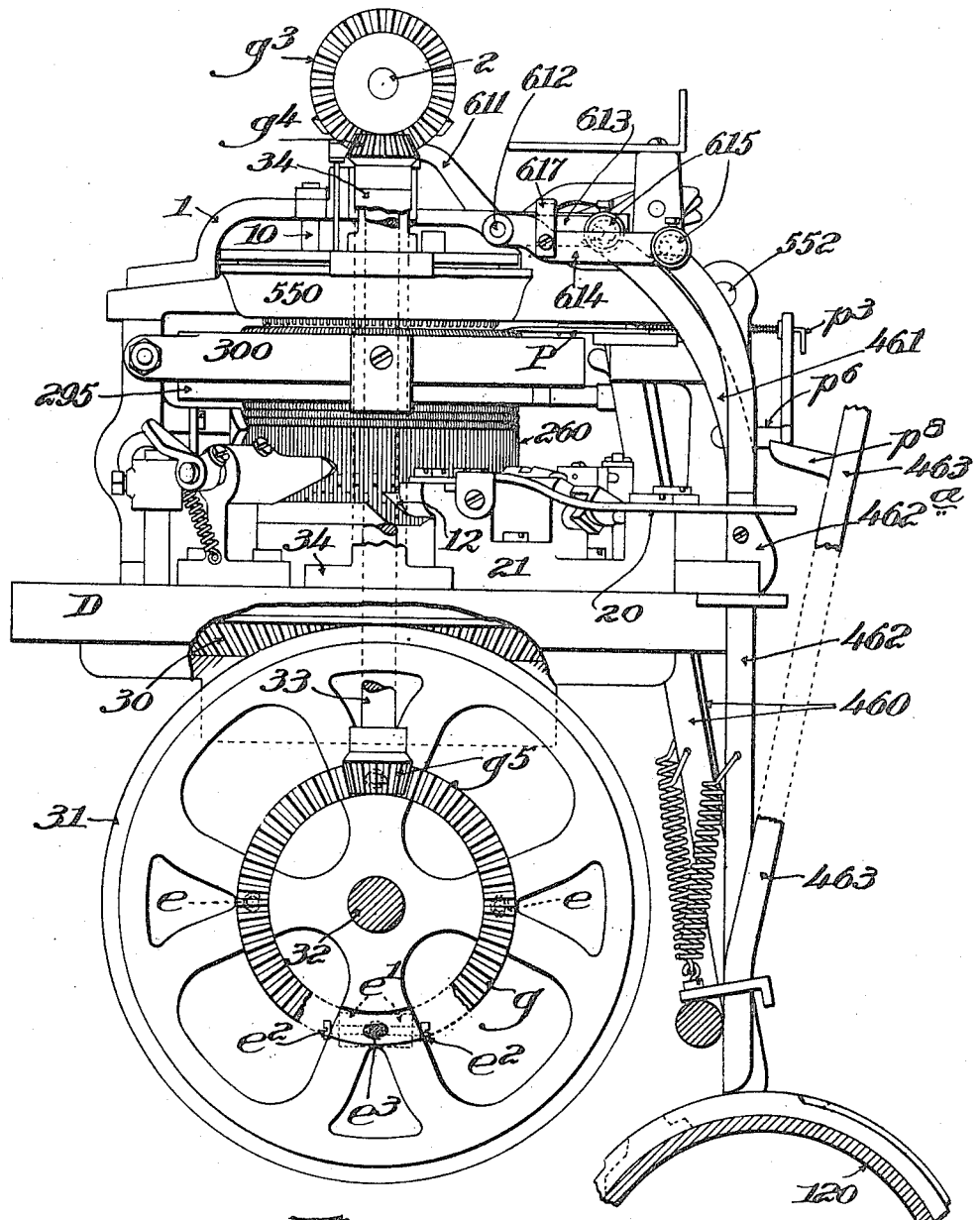
Figure 1 is a side elevation partly in section on the line 1—1 of Fig. 2.

While my new devices are applicable to knitting machines of many different types, I have elected to show them in connection with a knitting machine of the general type described and claimed in my United States Letters Patent No. 1,148,055, dated July 27, 1915, which patent may be consulted for features of the machine not herein described or shown in the drawings.

In my said machine the knitting instruments proper are latch needles held in a needle cylinder or carrier 260 supported for rotation with a bevel gear 30 upon bed plate D, gear 30 meshing with gear 31 on main drive shaft 32. Cylinder 260 carries a web-holder bed 295 having therein web-holders $w$ for actuation by web-holder cam cap 300, held relatively stationary with respect to bed-plate D as by contact with one of two standards erected on the bed plate, one of which standards has pivoted thereon at 552 a latch-guard ring 550. Yarns are supplied by a series of yarn guides some of which may be movable with respect to said latch ring, whereby to withdraw their yarns above and within the needles $n$ carried by cylinder 260. A preferred arrangement of yarn guides comprises the yarn fingers $F^1$ to $F^5$ inclusive, in any desired number, pivoted at 554 for actuation by thrust bars 460, as explained in my said patent.

The machine may be supplied with means substantially as described in my said Patent No. 1,148,055 for automatically predetermining at desired times withholding from action a series of needles $n$ intercalated among the other needles. As illustrated in Fig. 8, for instance, a supplementary cam 382 mounted in advance of the main stitch cams 360, 361, may be arranged at predetermined times to enter into contact with the operating butts of every other needle, whereby to deflect these needles beneath the stitch cams and out of the range of yarn supplied by the yarn guides $F^1$ to $F^5$ in the opening or throat 560 of the latch ring 550. The separation of the needles for this purpose may be caused, as explained in said patent, by a jack-cam 366 coöperating with jacks 381 placed in the grooves with the needles to lift the needles desired not to be influenced by cam 382 out of range of said cam.

Figure 2:
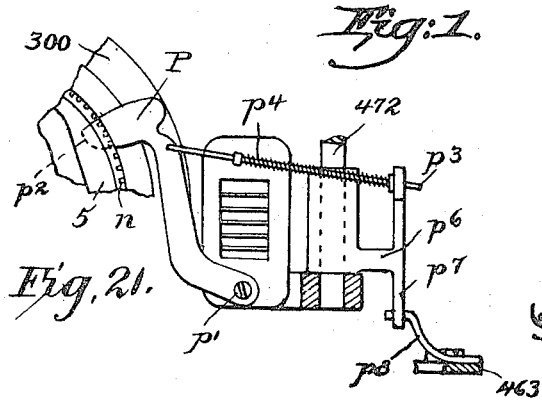
Fig. 2 is a plan.

As explained in my said Patent 1,148,055, this arrangement is capable of automatic operation to form the selvage shown in Fig. 2 of my Letters Patent No. 1,045,621, dated November 26, 1912, by the method described and claimed in my Patent No. 1,094,347, dated April 21, 1914, reissued No. 13,752 June 16, 1914, and when so operated, the fabric is automatically begun upon all of the needles, the product presenting a non-raveling selvage free within the needles.

As described and claimed in my application, Serial No. 49,161, filed September 7, 1915, [Letters Patent No. 1,189,744, dated July 4, 1916] having formed a non-raveling selvage a bight of the yarn of any subsequent course of the fabric may now be detained for subsequent replacement on the needles to unite a previously knit and a later knit part of the fabric. I will now describe means cooperating with the knitting devices for the purpose of detaining and replacing such bights or loops, but it will be understood that my said devices are applicable to other purposes and that my invention is not to be restricted except as defined by the appended claims to combination with or use in connection with knitting devices of any particular type.

In order to knit a section of fabric which can constitute an inwardly turned fold, exposing the right or wale side of the fabric of which it is composed at the outside of the folded portion, it is necessary to detain the fabric near, or return the fabric to the needles in such a manner as to permit the progress and growth of the fabric constituting the fold or welt beneath the detained portion, or to provide for returning the beginning edge of the fabric within and above the subsequent fabric. When the needles are arranged as above mentioned, in order to detain a bight near the beginning edge at relatively frequent intervals, and then to knit a section of fabric for the welt, it is requisite that space for the growth of the fabric behind the needles and under the detaining means be provided.

These conditions are met by instruments mounted in an internal dial suspended above and within the circle occupied by the last course of fabric knit, when the machine is of the form shown. It will be understood, however, that in machines of other forms I may provide for detaining loops of the fabric outside of the needles or beneath the last knit course, within the scope of my invention.

In one preferred form of my devices the dial 4 fastened to or integral with the center spindle 3 is held centrally within the needles and above the plane of the stitch supporting parts of the web-holders $w$ by a depending bearing 8 formed in a bracket 1, preferably two-armed as shown, mounted upon the latch ring 550, so that the bore in the bearing 8 is coaxial with the center of motion of the cylinder 260. Dial 4 is supported against gravity by a suitable collar, which may be the hub of gear $g'$ fast on center spindle 3, which gear meshes with and is driven by a gear $g^2$ fast on shaft 2 in horizontal bearings of bracket 1, which shaft 2 is driven by gear $g^3$, which, when the latch ring 550 is in the normal position illustrated in Figs. 1 and 3, meshes with a gear $g^4$ fast on a vertical shaft 33 driven by any suitable means. In the preferred construction shaft 33 stands above main shaft 32, and is passed downward through a bore in bed plate D, being supported by a bearing bracket 34 and driven by a bevel gear $g^5$ meshing with a toothed annulus $g$, in turn driven by main shaft 32, so that the needle cylinder 260 through the connection 30, 31, rotates in unison with the dial 4 driven by the connection 32, $g$, 33, $g^4$, $g^3$, $g^2$, $g^1$, 3.

For a purpose presently to be mentioned, it is desirable that the rotative adjustment of dial 4 with respect to cylinder 260 through arcs less than those subtended by the instruments carried by the dial may be provided for. For this purpose annulus $g$ may be mounted on a seat turned in the hub of gear 31 by hold-down screws $e$ fastened through slots in gear 31, which is provided with a lug $e'$ carrying screws $e^2$ acting on one of the screws $e^3$ fast in annulus $g$.

The gear $g^3$ and the gear $g^4$ are separable when the latch ring 550, the bracket 1 and the parts carried thereby are lifted about the pivot 552, for access to the needles, and mating teeth of said gears are marked, whereby the dial 4 and the latch ring having been lifted away from the needles, may be returned in exact adjustment.

For the specific use now to be described the dial 4 is provided with radial grooves $h$, Fig. 6, extending between an inner annular recess $h'$ and an outer annular recess $h^2$, turned down to the plane of the bottom of the grooves $h$. Preferably the dial is of such a thickness, as shown in Fig. 7, as to leave but little metal beneath the plane of the bottom of the grooves.

In the preferred construction, the verge of the dial is provided with pockets wider than the grooves $h$ preferably formed by bits $h^3$ mounted in radial grooves $h^4$, which may if desired be milled through the entire thickness of the dial, in which grooves said bits are fastened by friction, soldering or otherwise. Each bit is provided with a lug $h^5$ projected above the upper surface of the dial 4 at the verge, which verge may be chamfered away at an angle to the axis, as shown. The bits $h^3$ may be integral parts of the dial 4, if desired.

The projections $h^5$ together form an annular ridge adapted to engage and rotate in a groove in the cam cap presently to be described.

Any number of grooves $h$ may be provided in the dial, but for the purpose of receiving transfer implements adapted to detain at and thereafter replace bights of yarn on the needles, the number of grooves may be the same as, less than, or any divisor of the number of needles $n$ adapted to be retired beneath the stitch cams by the operation of cam 382. For a definite instance, assuming 220 needles and the action of cam 382 on recurrent needles, specifically each alternate needle, the dial 4 may then have 110 grooves $h$, and thus be adapted to receive instruments coacting with bights of yarn at the location of each of the needles affected by cam 382; being also adapted to receive such instruments in every alternate groove, to coact with every fourth needle $n$, or to receive in any desired number of grooves transfer implements adapted to detain and replace loops at the desired parts of the fabric.

The implements T mounted in the grooves $h$ may be of any form adapted to receive, hold, and release bights of yarn formed at the needles, but I prefer implements such as those illustrated in Figs. 11 and 12, each comprising two flat bodies $t'$, $t^2$, having actuating butts $t^3$, the part $t'$ being bent outwardly at $t^4$ and terminating in a point $t^5$ having behind it a notch $t^6$ and a shoulder $t^7$. The part $t^2$ is similar, except that a bend $t^9$ therein is symmetrically opposite to the bend $t^4$ of implement $t'$.

The parts $t'$, $t^2$, are preferably made of thin, resilient sheet steel, whereby a symmetrical pair T, as shown, may be placed in the same groove $h$, the actuating butts $t^3$ for the pair extending above the upper surface of the dial 4. The parts $t'$, $t^2$, may or may not be fastened together, but preferably are separate.

As shown in Fig. 12, some of the transfer implements T have shorter butts $t^8$ than the normal longer butts $t^3$.

In use, see Figs. 7, and 15 to 17, about half of the transfer implements may have longer butts $t^3$ and about half shorter butts $t^8$.

The differentiation in length of butt of the transfer implements is primarily to enable any phase of their actuation to be begun at a particular implement T, for instance that one having a longer butt leading in the direction of rotation, the described construction also enabling actuating cams for the transfer implements to be entered to work upon the butts and removed from work upon the butts in a direction parallel to the axis of rotation.

Referring now to Figs. 8 to 19 of the drawings, normal relative rotation of the needles, needle carrier and dial 4 is in the direction of the arrows on said figures, the butts of all of the needles $n$ passing above leading stitch cam 361, under a top center cam 357, and down the slope of cam 360, whence the needles return to a middle or tuck position illustrated by needle $n^4$ in Fig. 18, having taken one of the paths shown in full lines in Fig. 13. Such needles as are provided with jacks 381 are lifted to clear their latches upon reaching the place of cam 366, prior to passing radial plane A—A, passing thence to the stitch cams, as shown by line J in Fig. 13. My said prior machine includes in the cam 382 and its operating devices means for depressing the intervening needles after they have passed plane A—A and before they have passed plane B—B or the stitch-cams, so that the needles without jacks pass the yarn-feed and other devices near plane B—B at a low position shown for needle $n^5$ in Fig. 18, whenever cam 382 is operatively positioned, as shown by line N of Fig. 13.

I provide, for detaining a bight of yarn, means associated with the transfer implements T for moving their point ends $t^5$ between needles taking a normal path, as J, through the stitch cams, which movement is permitted by the depression in path N of the needles influenced by cam 382. This movement of the transfer implements T, hereinafter referred to as the bight-taking movement, (see Fig. 18) is such as to take the notches $t^6$ into line with the needles, the heads $t^4$, $t^9$ being over a depressed needle in path N, while the intervening needles in path J are elevated, for instance while in passage of the yarn-feed throat 560 and center cam 357, the outward position of the implements T being maintained during all or a part of the recession of the needles active to knit at stitch cam 360.

For replacing or transferring the detained bight on the needles, for instance the needles at whose places the bights were detained, I provide for passing the transfer implements T and their detained bights over a depressed needle (see Fig. 19) preferably in the presence of other needles advanced to stand across the plane of the implements T, and web-holders $w$ held inward; and employ means for then advancing the depressed needle to enter the detained bight by passing between the bends $t^4$, $t^9$ of implements T, and means for thereafter withdrawing the implement T so that points $t^5$ pass out of the bight and retire within the dial.

While the transfer movement may take place at any part of the needle series, I prefer to make the transfer after the needles have been separated by jacks 381 and cam 366 and prior to their actuation by cam 382 or the stitch cams. While I may so organize my machine as to transfer to needles at the middle or tuck position, and may cause the transfer operation to occupy any desired angle of one relative rotation, I prefer to retain the bights at a relatively low plane with respect to the forming knit course and to localize the transfer movement, and therefore have provided means for the special depression of the needles about to receive bights from the implements T, and their immediate advancement to a middle position, followed at once by withdrawal of the implements T and their retirement into their carrier out of the way of the remaining operations.

The needle cam ring 271 is for the above purposes provided with a depression 43 and slope terminating at 41, in which depression a substantially radially sliding cam 12, spring pressed outwardly, is mounted on a support 21 for actuation at desired times by a horizontal lever 20 pivoted on said support and having one end in contact with said slide and the other end positioned to be moved by a cam $462^a$ adjustably attached to a thrust-bar 462 worked by suitable cams on drum 120.

Cam 12 affects only such needles $n$ as have not been advanced by their jacks, and slope 41 restores needles affected by cam 12 prior to their passage of cam 382 or stitch cam 361. Operation of cam 12 will not cause needles affected by it to drop their previous stitches, the needles having failed to clear their latches after knitting at cam 360. A bight of yarn taken from an instrument T may therefore be placed upon a needle which still bears its previous loop.

Referring now to Figs. 4 and 5, the actuation of the transfer implements is controlled by cams $a$, $b$ and $c$ movable through openings $a'$, $b'$, $c'$ formed in the dial cap 5 which is further provided with a concentric groove $d$ of sufficient width to permit the instruments T to be positioned with their points $t^5$ within or without the verge of the dial 4.

Cam cap 5 is further provided with a concentric groove $d'$ taking over the lugs $h^5$ of the bits $h^3$, so that a yarn sweeping the edge of dial and dial cap can not find entrance between them.

The groove $d$ is suitably enlarged to permit the butts of the transfer implements to be moved outward whenever the cams $a$ or $c$ are positioned to contact with said butts, and the points of the cams approached by the rotating series of butts may be housed as shown in depressions formed in one wall of the groove to prevent a locking encounter of the cam with a butt.

Cam $a$ is for positioning the transfer implements T to take a bight of yarn.

Cam $c$ is for positioning the transfer implements to transfer a bight of yarn to a needle actuated to receive it. Cam $b$ is used for withdrawing the empty implements T within the verge of the dial after they have delivered their loops or bight. The cam $c$ projects the implements T further than cam $a$, which is followed by a slope ending at $a^2$ for returning the transfer implements to a position in which their points are retracted with respect to and just behind the needles, but not much withdrawn with respect to the verge of the dial, thereby enabling the lower edges of the transfer implements to stand over and hold from rising into contact with the needles any irregular bunches or folds of welt fabric which may be formed during making a long welt. One relation of the places (but for clearness exaggerating the relative extents) of movement of the implements T and the web-holders is for convenience of inspection shown in plan in Fig. 14 in relation to the corresponding paths of the needles shown in elevation in Fig. 13. Path $A'$ is that induced by cam $a$; path $C'$ is that induced by cam $c$; path $T'$ represents the position of implements T during knitting of fabric after bights have been taken; and path $T^2$ represents the withdrawn position after transfer induced by cam $b$.

The cam $a$ is carried by cam block $k$ held to slide, see Fig. 4, on pins $k'$ and $k^2$ projecting from plate 5, pin $k^2$ entering a cell $k^3$ forming a part of the block $k$, which is slotted to receive pin $k^2$. A compression spring $k^4$ reacting between the top of pin $k^2$ and cell $k^3$ normally lifts block $k$ to withdraw cam $a$, attached thereto by screw $a^3$, out of contact with any of the transfer implement butts $t^3$, $t^8$.

The cams $b$ and $c$ are similarly mounted, and for the present purposes may as shown be held for movement together on the same block $m$, upon flats of which the cams $b$ and $c$ are adjustably attached by screws, pins $k^7$ and $k^5$ suitably placed in plate 5 taking respectively into a slot in and a cell $m'$ of block $m$ having a compression spring therein normally lifting block $m$ to withdraw cams $b$ and $c$ from contact with any of the instrument butts (see Fig. 7).

While I prefer the described construction enabling the cams $a$, $b$, and $c$ to be entered and removed from work, it will be obvious that said cams may be mounted to move radially for some purposes, and that pivotal mountings permitting movement into and out of the plane of plate 5 may in some cases be substituted for the sliding mountings $k$ and $m$ without substantial difference in result.

Suitable connections are provided for automatically depressing and releasing blocks $k$ and $m$ to determine operation at the desired times of the instruments carried by dial 4. Referring now to Figs. 1 and 2, a horizontal stud 612 mounted on the latch ring may, for instance, carry bent levers 613 and 614 terminating respectively above the cells $k^3$ and $m'$, so that upward movement of the outer ends of said levers will determine independently depression of blocks $k$ and $m$. Such movements are given at the desired times related to the stage of production of the article being knit by connections to the pattern-surface controlling the knitting devices, for instance the cam drum 120 and thrust-bars 460, 461, 462 of my said prior machine, bars 461, 462 extending upward and forward under the rear ends of levers 613, 614 respectively. Said levers may each be provided with an adjustable abutment for contact with said bars, such as the rotatable plugs 615 held in bores of said levers by set-screws, each plug having an eccentric pin 616 for contact with the flattened upper end of the respective thrust-bar. When the latch-ring 550 is lifted the rear ends of levers 613, 614 are free to lift away from the bars 461, 462. Suitable stops for said levers, such as a part of the latch-ring under lever 613, and a lug 617 on lever 614 taking over lever 613, prevent said levers from swinging out of position to contact with bars 461, 462 when the latch-ring is replaced. The dial-cam mountings preferably are confined to a segment ahead of the yarn-feed point.

One preferred construction of the dial cap plate 5 is that shown, a central integral boss 6 bored for bearing 8 being mounted on said bearing above dial 4, cap plate 5 resting upon or near and being held relatively stationary with respect to the rotating dial 4 by any suitable means, such as the stud 10 held in a bore in said plate and fast in a bore in bracket 1.

Yarn-feeding means adapted to enter and withdraw yarns across the line of needles $n$, for yarn-changing and for sectional splicing, and means for severing and holding the yarns withdrawn behind the needles may be caused to coöperate with a dial and dial cap plate of the kind above described. I do not herein claim such yarn-feeding, severing or holding means, which are the subject of other applications for patent, but I have shown herein a guide and clamp 7 spring actuated about a pivot 9 in an arm fast to a flat face of boss 6, so that a yarn taken under the guide and clamp 7 by elevation of any of the yarn-guides $F^1$ to $F^5$ is held upon the upper surface of a depressed part of cap plate 5, said yarn sweeping the upper surface and edge of the cap plate 5 by the relative motion of the needles, fabric, or instruments T. In a slot 17 of plate 5, the point of a stationary shear blade 15 mounted on another flat of boss 6 receives the yarn, for severing by a movable blade 16 pivoted to blade 15, and moved by a lever 611 pivoted on stud 612, and passing over one of the thrust-bars 460, by which it is worked through the agency of cams on drum 120 whenever any of the yarn-guides $F^1$ to $F^5$ is actuated to withdraw its yarn. Opening movement of the shear blade 15 lifts clamp 7 to release a yarn and to permit entry of the withdrawn yarn.

Fabric being formed on the needles $n$, if detained by bights taken on implements T, will by the action of the web-holders $w$ be carried toward the space under the dial 4. When a long in-turned welt W, Fig. 10, is to be formed, it is desirable to insure the regular passage of the fabric first formed, until there is a length of fabric of considerable extent, within the narrow annular opening between dial 4 and the parts at the top of cylinder 260. I may provide means for this and certain other purposes, having illustrated as one instance of an instrument for this purpose a welt-presser P arranged to guide the welt fabric away from the needles and maintain the bights at the first-formed end of the welt under some inward tension with respect to the points of implements T. Presser P may be a lever made of thin resilient metal, pivoted at $p'$ on the standard supporting latch-ring 550, so that a downwardly bent cam end $p^2$ may be moved forward over the web-holders and under the dial 4 and over that part of the needles $n$ passing under cam 360. Actuation is by any suitable connection, shown as a wire link $p^3$ hooked into a hole in presser P and passed through a hole in a vertical arm $p^5$ of a rocker $p^6$ swinging on stud 472 in a fixed part of the machine. A compression spring $p^4$ surrounding link $p^3$ and taking against a stop thereon provides means permitting the presser P to be held forward under spring tension only during the desired part of the knitting for the welt.

Rocker $p^6$ has an arm $p^7$ in the path of an adjustable tappet $p^8$ fastened to thrust-bar 463, which may be a connection employed for an overhead yarn take-up, not shown. Suitable cams on drum 120 lift bar 463 to insert presser P during knitting of fabric for a welt.

I may also provide means for moving presser P when the machine is knitting sectionally spliced parts, in combination with means acting to move one of the yarn fingers, as $F^1$, presser P then acting to guide the splicing yarn under the dial, but I do not herein claim this combination.

Automatic operation of the devices above described may be under the control of a pattern surface such as drum 120, which may be actuated substantially as described and claimed in my said Letters Patent No. 1,148,055, so that movements of said drum will at times occur during consecutive passages of predetermined segments of the needle cylinder 260 at the parts actuated by the pattern surface. Thrust-bar 461 for cam 382 and thrust-bar 462 controlling dial cam $a$ for bight-taking are independently actuated by cams suitably placed on said pattern surface for moving said bars in two stages beyond their position of rest. Cams $b$ and $c$ for transferring the taken bights to the needles are operated by the same thrust-bar 462 employed to move the needle-cam 12, said bar 462 also being moved by cams on said pattern surface in two stages in advance of its position of rest.

For the usual stocking knitting purposes the needles $n$ are divided into a series $n^2$ having longer butts and a series $n'$ having shorter butts, which may be separated for other purposes such as entering a splicing yarn, forming no part of my present invention, by segments of needles having butts $n^3$ of intermediate length taking the same knitting path as the long-butt needles $n^2$ with respect to switch cam 415 and other stocking knitting devices.

I will now explain a typical operation of the machine, referring particularly to Figs. 9, 10, and 13 to 19.

Assuming all the needles to be bare and the cams 382, 12, $a$, $b$ and $c$ withdrawn, and all of the yarn-guides inoperative, one of the yarn-guides is actuated to insert its yarn, which is taken by some or all of the needles I, (Fig. 9) for an idle run of yarn $y'$. Pattern surface 120 then moves to move cam 382 part way in during passage of needles $n'$, whereupon the leading longer-butt needle of segment $n^3$ is first actuated and during the first passage of segment $n^2$ thereafter, cam 382 moves all the way in, so that all of the needles without jacks retire to path N holding the yarn $y'$, but the other needles take yarn for a course $y^2$, casting off yarn $y'$.

Cam 382 is now retired, running off the end of the segment $n^3$, $n^2$, $n^3$ while part way in, so that the leading needle of segment $n'$ and all the other needles following it pass into the stitch-cams, those needles which had taken path N passing in front of yarn $y^2$. All of the needles take yarn at the stitch cams for course $y^3$, which envelops the yarn of course $y^2$, the idle yarn $y'$ being cast off free as shown at III, Fig. 9. Courses $y^2$ and $y^3$ form a non-raveling selvage, such as shown in my said Patent No. 1,045,621.

During a passage, for instance the next subsequent passage, of segment $n'$ (or if desired after one or more intervening courses of fabric knit on all of the needles) the selvaged edge being within the needles and the course on the needles controlled by the web-holders $w$, cam 382 is again moved part way in, and at or about the same time bar 461 is actuated to move cam $a$ part way in, to first engage the longer butts $t^3$ of implements T, Fig. 15. The leading longer-butt needles may, as shown in Figs. 15 to 17, be in a rotative sense in advance of the leading longer butt transfer implements, so that a few of the needles without jacks enter path N without any movement of the corresponding transfer implements T by cam $a$ to bight-taking position, but this is without detrimental result. The leading needles and implements T having been actuated by cams 382 and $a$ respectively, both cams are moved in before the passage of the following shorter-butt segments to insure the movement of all the needles and all the implements T. Implements T are now positioned as shown in Fig. 18, over courses $y^2$ and $y^3$ and over the heads of needles in path N, typified by needle $n^5$, which hold their previous loops, and between active needles typified by needle $n^4$, so that the yarn taken by the active needles will be deposited in bights $z$ in notches $t^6$ by movement of the needles down cam 360, with the result indicated at IV and V, Fig. 9, the yarn of course $y^4$ being knit by the active needles, as indicated at V.

Before the course $y^4$ is wholly cast off, the implements T will be withdrawn by cam slope $a^2$ of dial cap 5, so that needles affected by cam 382, now rising to their middle position, will be free from contact with implements T. Slope $a^2$ has now withdrawn all the implements T to their intermediate concentric position, in which their points $t^5$ are within and near the backs of the needles.

The bights $z$ being above and the selvage $y^2$, $y^3$ below the points $t^5$, movement of the fabric $y^2$, $y^3$, $y^4$, $y^5$ etc. off of the points $t^5$ is restrained by the engagement of the points with the closed loops made up of the fabric $y^2$, $y^3$ and the bights $z$. It is well known that fabric when cast off tends to contract, and in the case of the selvage fabric $y^2$, $y^3$ or other fabric in the same situation, the contraction of this free previously-formed and cast-off fabric now lying under the points $t^5$ and the verge of the dial further holds the loops $z$ toward the center of the machine and on the free-ended points $t^5$.

Welt-presser P will be actuated during the bight-taking movement, and may remain in as long as desired. I prefer to remove the presser before the completion of all the fabric for the welt, the described position of the implements T preventing the fabric, once an in-turned fold has been begun by presser P, from rising into the wrong position.

Cam $a$ is withdrawn at the beginning of the second passage by it of the longer butts, the shorter butt segment not being advanced a second time. A few of the longer butt segments may be advanced twice to receive bights of two courses of yarn, without detriment to the fabric, but the withdrawing movement of cam $a$ usually is so timed as not to advance the leading long butts a second time far enough to take a bight. Cam 382 is withdrawn to run off the longer-butt needles, during their corresponding passage, but no needle standing in the plane of an instrument T will be entered in the stitch cams to collide with an implement T by reason of the angular separation of the cams 382 and $a$. Cams 382 and $a$ are now completely withdrawn, and the machine knits any desired length of fabric for the welt as predetermined by motions of pattern surface 120, the bights $z$ remaining suspended on the points $t^5$ at the verge of dial 4. During the course or the next few courses following removal of cam $a$, the yarn may be changed, as when a heavier yarn is employed for the selvage and the uniting course $y^4$.

After any desired length of fabric of the welt has been knit, welt-presser P is withdrawn by operation of thrust-bar 463. The yarn may be changed, if desired, at any point in the knitting of the welt by working the thrust-bars 460. When sufficient welt-fabric is completed, implements T are actuated by cams c and b to place bights z on the needles, which are moved to coöperate with implements T for this result. Thrust-bar 462 is for this operated in two stages, the first taking cams 12, b and c into first contact with the leading longer-butt needles and transfer implements T. By reason of the angular relation of the respective segments of needles and implements T and the position of cam 12, the needles without jacks 381 will take the path N', Fig. 13, before the first implements T pass outward at cam c to a transfer position more advanced than their bight-taking position, as indicated at C, Fig. 14. The advanced active needles taking path J are effective at this time to prevent any part of the fabric except the bights z held in points $t^5$ from accompanying the implements T into the plane of the needles. The needles without jacks rise at the slope 41 immediately before the recession of the implements T begins, the heads of the needles passing between the parts of the implement T and penetrating the bights z now held forward and held open by the heads of implements T. The drawing-in slope $b^3$ of dial cap 5 now withdraws the implements T, the points $t^5$ leaving the bight z and springing open to pass the needle to which the bight z has been driven. Cam b completes the withdrawal of implements T, which now are wholly within the verge of dial 4. Cams 12, b and c having moved for the above functions a sufficient segment respectively of the needles and implements T, are now moved all the way in to subject all of the instruments to their effect, and at any desired time thereafter are moved out to their original inoperative positions, but friction in the grooves h now retains the implements T in their innermost position until the cam a is again worked.

Operation of the cams 12, b and c caused the uniting course $y^4$ as shown at VII, Fig. 9, to be placed or transferred in addition to their normal loops, on such of the needles as were provided with corresponding implements T. As shown, these may be alternate needles, but the operation having produced a selvage $y^2$, $y^3$, the edge of the fabric is secured against raveling to unlock the uniting course $y^4$ whatever the frequency of the implements T relative to the number of needles. The uniting course, being a part of the knit structure subsequent to the selvage, is free to yield yarn from loop to loop, whereby improved strength and elasticity are secured without causing raveling if some of the loops of said course should be broken in making or in use. But it will be understood that my improved machine devices are adapted by mere change in the time of moving the described bight-taking means to take bights from the yarn of any course, for instance yarn of one of the selvage courses, as $y^2$ (Fig. 9, diagrams II and III) to produce a useful structure, which may differ from that of my said Letters Patent No. 864,433 in having such loops at every fourth or sixth wale only, or at other desired intervals, the selvage structure being effective to protect the fabric of the welt between such loops.

The remainder of the article may be made in any desired or usual manner.

When it is desired not only to avoid taking bights from two courses on some of the implements T, but also to avoid forming in the fabric at the place where the bights are taken draw-stitches made by detaining some of the needles in path N during a course in which no bight is taken at those needles, I may arrange the usual long and short butt needles $n'$, $n^2$, to coöperate, as shown in Fig. 20, with means for limiting the special actuation of the needles for bight-taking to a single revolution, such as an advancing cam $12^a$ carried by the same mounting as and movable with the cam 12, cam $12^a$ being set farther inward on its mounting than cam 12 by a distance less than the difference in length of the needle-butts. Thrust-bar 462 is then arranged for movement into three positions in advance of its position for wholly withdrawing the slide for cams 12 and $12^a$, of which the first position, as indicated in Fig. 20, is such as to cause cam $12^a$ to advance the long-butt needles only, cam 12 being still withdrawn from contact with any of the needles. During the taking of bights by coöperation of cams 382 and a (recalling that cam 382 begins its actuation at the leading longer-butt needle without a jack 381) and during the actuation by cam 382 of the short-butt segment $n'$ next following, cam $12^a$ is now positioned to take the longer-butt needles out of reach of cam 382 at a second passage, and both cams 382 and $12^a$ are then withdrawn. It has been explained above that motion out of operative position of cam a can limit the effective motion of implements T to one complete round. The relative position of the leading longer butts $t^3$ of the implements T and dial 4, when the device of Fig. 20 is used, is such as to make the leading longer-butt instrument T coincident with the position of the leading longer butt needle without a jack. Cam $12^a$ does not interfere with the operation when cam 12 is moved inward as above described when the bights are transferred.

My devices being additional to a fully organized automatic machine and not excluding the presence or use of any of the parts, my machine is capable of knitting highly organized products, such as half-hose or women's stockings having the described welt structure of any desired length and any desired kind of seamless leg, heel, foot and toe, ravel-stop structures, and any desired yarn-changes, splicings, or stitch-length changes. The yarn-feed mechanism or both the yarn-feed and yarn-severing mechanism may be operated to eject the finished article, my devices thus being capable of knitting separated articles during continuous operation, but it will be apparent that the implements T may be operated to detain a fold for a welt, or for other purposes, at any time in the production of fabric, for instance in a string-work of fabric. It will also be apparent that much of the structure of my machine is adaptable without change to rib-knitting with two sets of needles, and that my new devices are applicable without invention to other kinds of knitting, or to machines operating in other ways, for instance to machines having stationary needle carriers and rotary actuating cams, or to machines having inwardly facing needles and an external dial.

What I claim is:

1. A knitting machine having needles and means for begining knitting of free-ended plain fabric on said needles by making a selvage, in combination with means adapted to receive a bight of yarn at the needles after the fabric is begun and hold said bight away from the needles, whereby to detain the fabric near the needles in a position for subsequent application to the needles.

2. A knitting machine having needles and means for beginning knitting by forming a selvage on said needles, in combination with means adapted to be operated to receive a bight of yarn at the needles and hold said bight away from and behind the needles during knitting of fabric for an in-turned welt on said needles.

3. A knitting machine having needles and means for knitting selvaged fabric on said needles, in combination with automatic means for taking bights of yarn at the needles and detaining said bights away from the needles during knitting of fabric for an in-turned welt on said needles.

4. A knitting machine having needles and automatic means for knitting a beginning selvage on said needles, in combination with means automatically acting thereafter to take and to detain bights of yarn at the backs of the needles during knitting of fabric for an in-turned welt on said needles.

5. A knitting machine having needles and means for knitting free-ended fabric beginning with a selvage on said needles, in combination with means mounted for coöperation with the needles adapted to receive a bight of yarn at the needles and hold said bight away from the needles in a position to permit further knitting.

6. A knitting machine having needles and means for knitting a beginning selvage on said needles, in combination with bight receiving implements and means for causing said implements to take between the knit selvage and bights of yarn formed at the needles, whereby to receive and hold said bights and selvage for movement away from the needles.

7. A knitting machine having needles and means for knitting selvaged fabric on and forming bights of yarn at said needles, in combination with automatic means coacting with said bight-forming means for taking and detaining away from the needles bights of yarn during knitting of fabric for an in-turned welt on said needles.

8. A knitting machine having needles and means for knitting fabric having a beginning selvage on said needles, in combination with implements independent of the needles, and means for supporting and operating said implements to take from the fabric and hold bights of yarn at the backs of the needles in a position to permit continued knitting of fabric for an inturned welt on said needles.

9. A knitting machine having needles and means for knitting a beginning selvage on said needles, in combination with means for forming in a subsequent knit course at the places of needles retaining their loops bights of yarn and implements for detaining said bights of yarn away from the needles during the knitting of fabric for an in-turned welt on all of said needles.

10. A knitting machine having needles, knitting means coöperating therewith adapted to cause certain needles to knit and then to withhold their loops, in combination with implements adapted and arranged to take bights of yarn from a knit course of the fabric at the places of said certain needles, and means for operating said implements.

11. A knitting machine having in combination a series of needles, knitting means coöperating therewith adapted to cause certain needles of said series to withhold their loops during knitting on intervening needles, free-ended implements adapted to receive a bight of yarn between said intervening needles, and means for holding said implements and bights of yarn out of contact with the needles during knitting of an extent of fabric.

12. A knitting machine having needles, means for knitting selvaged fabric on said needles, automatic means acting after the formation of the selvage for taking from the fabric and detaining away from the needles bights of yarn, during knitting of fabric on said needles, and means automatically operating to transfer said bights to needles, whereby to form an in-turned welt.

13. A knitting machine having needles and means for knitting a beginning selvage on said needles, implements adapted to pass between bights of yarn at the needles and said selvage whereby to lay hold of said bights, and means for moving said implements and bights thereon away from the needles during knitting, in combination with means for moving said implement to transfer said bights to needles.

14. A knitting machine having needles and means for withholding loops on recurrent needles after knitting one or more courses, in combination with a series of implements and means adapted to position said implements to receive bights of yarn at the needles whose loops are withheld and then move said bights away from the needles during knitting on all the needles of an extent of fabric continuous with said courses, whereby to form an in-turned fold, in combination with means for moving said implements to transfer said bights to needles to unite the beginning and end of said fold for an integral welt.

15. A knitting machine having needles, means for knitting a beginning selvage on said needles, implements and means operating said implements to take bights of yarn at some only of the needles subsequent to forming the selvage, and to hold said bights away from the needles during knitting of fabric on the needles, in combination with means operating on said implements to cause them to place the taken bights on the needles at a later time.

16. A knitting machine having needles and automatic means for knitting a beginning selvage on said needles, in combination with means automatically acting thereafter to take and to detain bights of yarn at the backs of and away from the needles during knitting of fabric, and means subsequently acting on said bight-taking means to cause said bights to be interknit with the forming fabric.

17. A knitting machine having needles and means for knitting a beginning selvage on said needles, in combination with means for subsequently taking at some only of the needles and detaining out of contact with the needles bights of yarn, during knitting of fabric for an in-turned welt on all of said needles, and means operating thereafter to replace the detained bights on a similar number of needles.

18. A knitting machine having needles, knitting means coöperating therewith adapted after the production of one or more courses of fabric to cause certain needles to withhold their loops, and implements automatically coöperating with said knitting means to take bights of yarn from the fabric at the places of said certain needles, in combination with means subsequently operating to place said bights on said certain needles.

19. A knitting machine having in combination a series of needles, knitting means coöperating therewith adapted to cause certain needles of said series to withhold their loops during knitting on intervening needles, implements adapted to receive a bight of yarn between said intervening needles, means for holding said implements and bights of yarn out of contact with the needles during knitting of an extent of fabric, and means coöperating with said implements and needles to place said bights on said needles and withdraw said implements.

20. A knitting machine having in combination a single series of needles, means for feeding yarn to said needles, a stitch cam, means to cause certain of the needles placed among the others to pass the stitch cam without taking the yarn while holding their previous loops, a series of transfer implements and means for projecting said transfer implements at the places of said certain needles to receive a bight of yarn between needles actuated by said stitch cam.

21. A knitting machine having in combination needles, means for feeding yarn to said needles, a stitch cam, means to cause certain of the needles placed among the others to pass the stitch cams without taking the yarn while holding their previous loops, a series of transfer implements, means for projecting said transfer implements at the places of said certain needles to receive a bight of yarn, and means for projecting said implements at a later time to deliver their bights to said certain needles.

22. A knitting machine having in combination needles, yarn feeding means, and means adapted to depress and then elevate certain of said needles with respect to neighboring needles remaining elevated to withhold the loops on said certain needles, and transfer implements adapted to move bights of yarn into and hold them over the depressed needles and in the space between elevated needles, whereby said bights are penetrated and transferred to the depressed needles when they are elevated.

23. A knitting machine having in combination needles, yarn-feeding means, transfer implements movable into and out of relation to the needles, means to advance certain needles intercalated among the others above the position of the transfer implements, means adapted to depress and then elevate intervening needles with respect to said certain needles and transfer implements, and means to move said implements and bights of yarn carried thereby into and hold them in the space above said depressed needles during a part of such elevating movement of said intervening needles, and means for withdrawing said transfer implements acting after the elevation of said intervening needles, whereby to transfer to said intervening needles bights carried by said implements.

24. A knitting machine having in combination needles, and cam means adapted to be positioned at predetermined times to depress and then elevate certain of said needles with respect to neighboring needles remaining elevated, in combination with transfer implements and means for moving said implements and bights of yarn carried thereby at the place of depression of said certain needles into and holding them in the space between elevated needles and for thereafter withdrawing said implements, whereby said bights are penetrated by said certain needles and transferred to them when said implements are withdrawn.

25. A knitting machine having in combination needles, knitting means coöperating therewith adapted to operate certain needles to cause them to withhold their loops, automatic means predetermining operation of said needles and knitting means to form a beginning selvage, means adapted to coöperate with a needle withholding its loop to take and detain a bight of yarn out of contact with said needle, and connections to said automatic means for causing coöperation of said needle- operating and bight- taking means.

26. A knitting machine having in combination needles, knitting means coöperating therewith adapted to operate certain needles to cause them to withhold their loops, automatic means predetermining operation of said needles and knitting means to form a beginning selvage, transfer implements adapted to coöperate with a needle withholding its loop to take and detain a bight of yarn out of contact with said needle during knitting of fabric on said needles, and connections to said automatic means for first causing coöperation of said needle-operating means and transfer implements to take a bight, and for thereafter operating said needles and implements to transfer said bight to the needles.

27. A knitting machine having in combination a series of needles, knitting and loop-withholding means therefor, yarn feeding means, and a series of sliding transfer implements mounted for movement into coöperative relation with the needles whereby to take, at the position of a needle operated to withhold a loop of the fabric, and thereafter detain a bight of yarn supplied to and knit by other needles.

28. A knitting machine having yarn feeding means and a series of needles, a series of appointed transfer implements having open notches adapted to receive at the place of a needle retaining its knit loop, a bight of yarn, means for supporting said implements, and means for projecting them with respect to the needles to different extents respectively to take and to transfer the taken bights of yarn to the needles.

29. A knitting machine having yarn feeding means and a series of needles, a series of transfer implements having open notches adapted to receive at the place of needle retaining its knit loop a bight of yarn, means for supporting said implements, and means for projecting them with respect to the needles at different times respectively to take and to transfer the taken bights of yarn to the needles.

30. A knitting machine having yarn-feed means, a series of needles, sliding transfer implements, a carrier therefor, and means acting on said needles and implements at different places respectively to move said implements in their carrier to project their ends into the series of needles to take a bight of yarn not taken at the yarn-feed by a needle of the series, and to place the taken yarn on the needle which did not take the yarn.

31. A knitting machine having needles, a series of transfer implements adapted to coöperate therewith, and means to project said series first to take bights of yarn and thereafter to place said bights on needles, in combination with means for withdrawing said implements from the needles into and causing them to remain in a plurality of different withdrawn positions with respect to the needles during knitting of a plurality of courses.

32. A knitting machine having needles, a series of transfer implements adapted to coöperate therewith, and means acting to project said implements to take bights of yarn at the needles, devices acting to withdraw said implements, means acting to project against said implements to transfer their taken bights, and means then acting to withdraw the empty implements to a greater extent than by the action of said devices, said means being adapted to permit said implements to remain in their last mentioned withdrawn position during knitting of a plurality of courses.

33. The combination in a knitting machine of a series of transfer implements with a plurality of projecting means therefor adapted severally to encounter and move said implements to different projected positions for the purpose of taking bights and transferring the bights; and devices enabling said projecting means to be independently advanced into contact with the implements to first encounter and move the same implements of the series.

34. The combination in a knitting machine of a series of transfer implements with a plurality of projecting means and a plurality of withdrawing means therefor adapted severally to move said implements to different projected and respectively to corresponding different withdrawn positions; and devices enabling said projecting means to be independently advanced into contact with said implements whereby to leave the instruments relatively stationary and withdrawn respectively to different positions.

35. A knitting machine having a needle cylinder, a dial, a latch-guard and a mounting therefor adapted for movement into and out of relation to the needle cylinder, and means movable with said mounting for supporting said dial permitting relative rotation between said dial and said latch-guard.

36. A knitting machine having a needle cylinder, a dial, a latch-guard mounted for movement into and out of relation to the needle cylinder, and means on said latch-guard for supporting said dial permitting relative rotation between said dial and said latch-guard.

37. A knitting machine having a needle-cylinder and a dial, supporting means for said dial adapted to swing said dial into and out of proximity to needles in said cylinder, and means outside of the space inclosed by the cylinder and dial for holding said dial relatively fixed in a rotary sense with respect to said needle carrier, said holding means having elements caused to be separated when the dial is removed from its operative position.

38. A knitting machine having a needle-cylinder and a dial, supporting means for said cylinder and dial permitting their rotation, said supporting means for the dial being adapted to permit the removal of the dial bodily from operative relation to the cylinder; rotating means for the cylinder, and means for rotating the dial in unison therewith when in operative position comprising a dial spindle, and a shaft geared to the dial spindle for removal therewith, gearing for driving said shaft having a driven element on and removable with said shaft, and a driving element rotating in a relatively fixed position with respect to said cylinder.

39. In combination in a knitting machine, a dial, a center spindle supporting said dial, a bearing bracket for said center spindle, and a support for said bracket hinged to permit bodily elevating said bracket, spindle and dial; a shaft in said bracket for the actuation of parts carried by said spindle, a gear on said shaft; a drive shaft and means for rotating said shaft in a relatively fixed part of the machine, and a gear on said drive shaft adapted to mesh with said first-mentioned gear.

40. A knitting machine having in combination a pivoted latch-ring, rotary parts carried by said latch-ring, and means for driving said parts comprising a shaft mounted on and overhanging said latch-ring, and separable gearing having an element respectively on said shaft and on a drive-shaft rotatable in a fixed part of the machine.

41. A dial and dial cap for use in knitting machines comprising a series of bits at the verge of the dial having lugs engaging a groove in the dial cap, whereby to prevent the entry of yarns between dial and cap.

42. The combination of a dial having grooves, a verge, and bits standing between the grooves at said verge, whereby enlarged pockets are formed at said verge, with transfer implements in said grooves having heads wider than said grooves adapted to be housed in said pockets when withdrawn, and means for operating said implements adapted to retain all of them at the same time in said withdrawn position.

43. A circular knitting machine having in combination yarn entering and withdrawing means, a series of needles and a grooved dial, sliding transfer implements having operating butts in the grooves of said dial, a flat-topped dial cap, and actuating cams for said implements mounted for movement into and out of the plane of motion of said butts whereby the transfer mechanism coöperating with the needles is maintained beneath a level permitting yarns to be manipulated above the dial cap.

44. A knitting machine having in combination needles and a grooved dial, sliding transfer implements arranged in segments having operating butts differing in length in the grooves of said dial, a dial cap whose upper surface defines a plane substantially at right angles to the needles, actuating cams for said implements mounted for movement into and out of the plane of motion of said butts, and means for moving one or more of said cams into said plane in stages, so as first to encounter and move the implements having longer butts into relation with the needles.

45. A knitting machine having needles in series having longer and shorter butts, a dial, and sliding transfer implements working in grooves in said dial, said implements being in segments having longer and shorter butts, means for moving the needles to permit coöperation with said implements comprising a cam movable in stages to first contact with needles having longer butts, in combination with means moving the transfer implements in relation to the needles comprising a cam and means to move said cam toward the surface of said dial in stages to first actuate implements having longer butts.

46. A knitting machine having needles, a movable depressing cam for said needles, means whereby certain needles are removed from the influence of said cam and means for advancing the depressed needles, in combination with a series of transfer implements adapted to be advanced between elevated needles at the position of a needle depressed by said cam, means for working said implements comprising advancing and withdrawing cams, and means for rendering said depressing, advancing and withdrawing cams simultaneously operative and inoperative.

47. A knitting machine having in combination, a pivotally mounted latch ring, a dial carried thereby, instruments in said dial having operating butts, a flat-topped dial cap and actuating means for said instruments comprising a cam reaching through an aperture in said dial cap, a mounting for said cam guided for movement vertically with respect to said cap, a spring for withdrawing said cam, and pattern operated means having elements mounted on said latch ring for movement therewith adapted to move said mounting against the stress of said spring.

48. A knitting machine having in combination a dial, implements therein having projecting butts, a dial cap having a concentric groove adapted to receive butts at different radial distances from the center of said dial and cap, and a plurality of movable cam means for actuating said implements at different times having withdrawing slopes adapted to leave the implement butts inactive at respectively different radial positions during a plurality of revolutions.

49. A transfer mechanism for hosiery knitting machines having yarn-feed means and a circle of relatively rotating needles comprising a dial, implements therein, a dial-cap above said dial, actuating cams and operating means therefor above said dial-cap and confined to a segment thereof preceding in the direction of relative rotation the position of the yarn-feed means, and yarn severing means mounted on said dial-cap at a segment thereof following the yarn-feed means in said direction.

50. A knitting machine having needles and knitting devices adapted to knit plain fabric seamless stockings having heel and toe pockets, including yarn-changing means, and means for starting knitting on the bare needles by the formation of a beginning selvage, in combination with a dial, transfer devices therein, an actuating means therefor suspended above the plane of the forming fabric, whereby to detain bights of yarn during knitting of an in-turned welt, operating connections for said knitting devices, a pattern surface for actuating said connections, and operating connections between said actuating means and said pattern surface.

51. A knitting machine having in combination needles, a dial suspended near the needles, and free-ended transfer implements having open upwardly facing notches in said dial, whereby to receive and detain bights of yarn between said needles and dial during knitting for an inturned welt, in combination with a welt presser and spring means for moving said presser into the space beneath the dial, thereby to maintain said bights under tension in said notches.

52. In a knitting machine, a series of needles, and means for operating certain of the needles distributed in said series to withhold their loops during the knitting of a single course on the remaining needles, in combination with implements adapted to receive and to detain bights of said course at one or more of the places of said certain needles.

53. A knitting machine having needles and bight receiving implements adapted for operation to receive and return to the needles a bight of yarn, whereby to form an in-turned welt, in combination with means for withdrawing needles from the knitting path to permit bights to be taken at their places, and means for causing said withdrawing means to act during one passage only of the entire series of needles.

54. A knitting machine having a series of needles and a series of transfer implements coöperating with said needles to take and detain bights of yarn during knitting of fabric for an in-turned welt, in combination with means for positioning said implements behind the needles and over the forming welt fabric during knitting thereof, whereby to prevent the welt-fabric from rising above said implements.

55. A knitting machine having a circle of needles, a dial, a series of implements in said dial adapted to receive and detain bights during knitting at the needles of fabric for a welt, in combination with actuating means for said implements causing them to stand across the otherwise open space between said needles and said dial during knitting of welt-fabric, whereby to cause the under sides of said implements to hold the welt-fabric in the space beneath the dial.

Signed by me at Boston, Massachusetts, this tenth day of December, 1915.

ROBERT W. SCOTT.